United States Patent

Mori et al.

Patent Number: 5,959,864
Date of Patent: Sep. 28, 1999

[54] NUMERICAL CONTROL APPARATUS TO CONTROL TOOL MOVEMENT BETWEEN BLOCKS OF A MACHINING PROGRAM

[75] Inventors: Atsushi Mori, Oshino-mura; Yoshinori Nakata, Minamitsuru-gun, both of Japan

[73] Assignee: Fanuc, Ltd., Yamana, Japan

[21] Appl. No.: 08/849,449

[22] PCT Filed: Oct. 4, 1996

[86] PCT No.: PCT/JP96/02898

§ 371 Date: Jun. 2, 1997

§ 102(e) Date: Jun. 2, 1997

[87] PCT Pub. No.: WO97/13184

PCT Pub. Date: Apr. 10, 1997

[30] Foreign Application Priority Data

Oct. 6, 1995  [JP]  Japan ..................................... 7-259862

[51] Int. Cl.[6] .................................................. G05B 19/416
[52] U.S. Cl. ............................. 364/474.01; 364/474.01; 364/474.3; 318/600
[58] Field of Search ........................... 364/474.3, 474.01; 318/600

[56] References Cited

U.S. PATENT DOCUMENTS 5,218,281   6/1993   Sasaki et al. ........................... 318/600
5,475,602  12/1995   Otsuki et al. ...................... 364/474.31

FOREIGN PATENT DOCUMENTS

5-73127   3/1993   Japan .

*Primary Examiner*—William Grant
*Assistant Examiner*—Peter W. Eissmann
*Attorney, Agent, or Firm*—Staas & Halsey, LLP

[57] ABSTRACT

An acceleration change determination device determines whether or not a change in acceleration at a joint in blocks in a matching program decoded by a pre-processing and arithmetic device is more than a predetermined value. When the change of acceleration is found to be more than the predetermined value, the speed commanding device adjusts the speed to lower commanded speed at points immediately before and immediately after the joint in blocks. A movement control device outputs an interpolation pulse to individual moving axes so that the speed becomes the commanded modified speed, thereby controlling a servo motor.

10 Claims, 7 Drawing Sheets

NUMERICAL CONTROL APPARATUS TO CONTROL TOOL MOVEMENT BETWEEN BLOCKS OF A MACHINING PROGRAM

BACKGROUND OF THE INVENTION

1. Field of the Invention

The present invention relates to a numerical control apparatus for controlling a machine tool in accordance with a machining program and relates to an automatic programming apparatus for making the machining program.

2. Description of the Related Art

Various techniques have been developed for securing the accuracy of a tool path for a machine tool to be driven at a high speed. Among these techniques, there is one for decreasing a moving speed of the tool so as to limit a degree of an acceleration thereof.

When a tool of a machine tool moves along a path at a high speed, a drive unit for driving the machine tool is required to output higher power at a position where the path is suddenly turned. The output of high power by the drive unit gives an impact on the machine tool, causing an error in machining shape. In order to avoid this error, in case where a path is suddenly turned or a path is along a circular arc having a small diameter, velocity is decreased so that variation in speed of individual axes will not exceed a certain level, that is, acceleration will not exceed an allowable value. As mentioned above, such acceleration is decreased by decreasing a velocity in accordance with the variation in a curvature of the path.

However, in the case of a machine tool having a specially high machining speed, such as a laser machining device, it is desirable to improve the accuracy of a shape of the tool path while maintaining a machining speed at a high velocity. To this end, a method has been proposed in which a tool path is formed to be as smooth as possible, thereby preventing an abrupt change in velocity and enabling machining to be performed at a high speed and a high accuracy.

Figure 7:
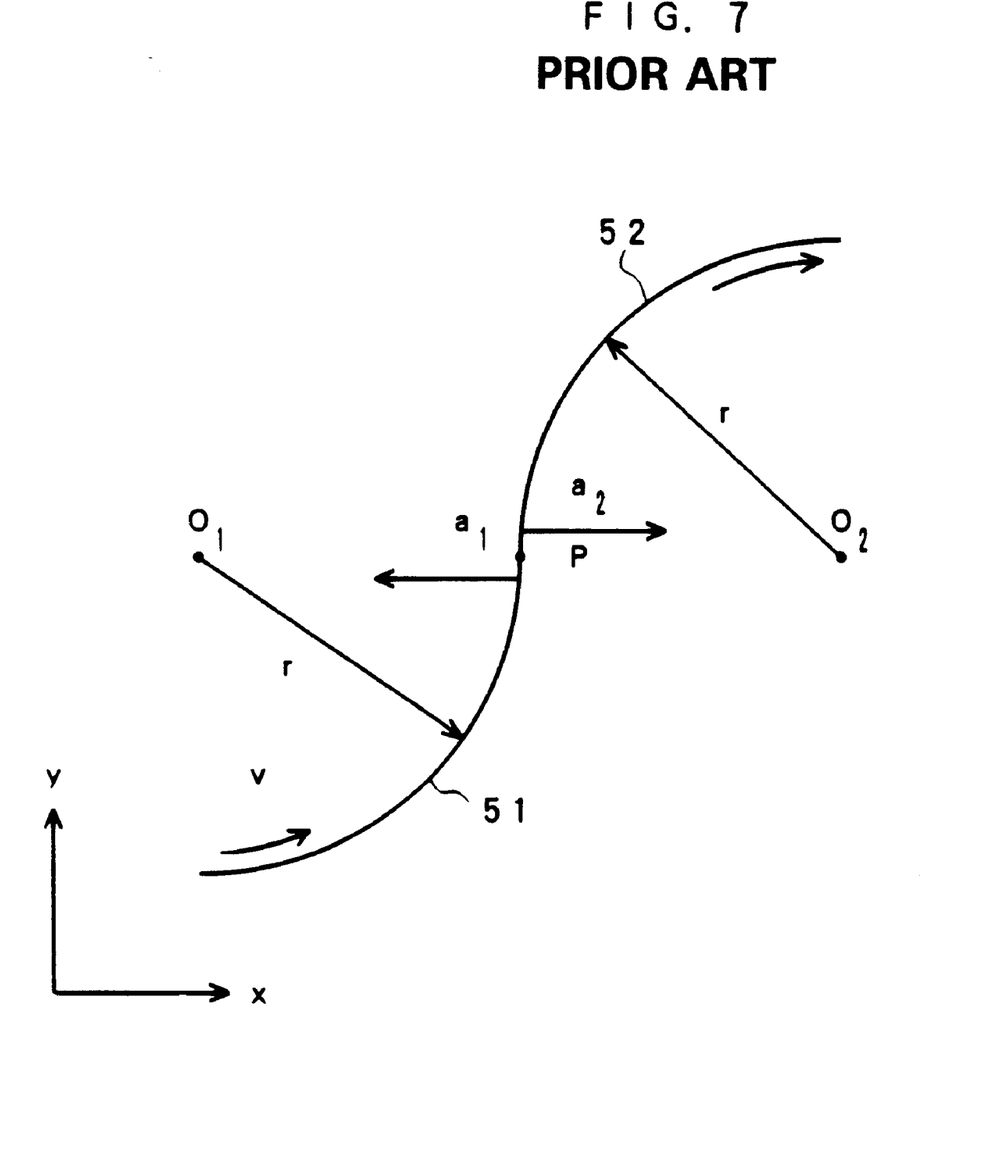
FIG. 7 is a diagram showing an example of a moving path formed by combining two circular arc blocks.

In the above way, though the magnitude of acceleration can be decreased by making the tool path smooth and by reducing the speed in the section having a small radius of curvature; an abrupt change in acceleration cannot necessarily be prevented. For example, when a tool moves from a first circular path to a second circular path, there may be a case where the turning direction of the second circular path is inverted. FIG. 7 shows an example of a moving path in which acceleration varies largely. In this figure, the moving path is changed from a circular arc 51 providing a counterclockwise path to a circular arc 52 providing a clockwise path. The first circular arc 51 has a center $O_1$ and a radius r. The second circular arc 52 has a center $O_2$ and a radius r. A transition point (a joint in circular arcs) from the first circular arc 51 to the second circular arc 52 is a point P, and the path is kept smooth even in a section including the point P.

In this case, an acceleration vector $a_1$ at an end point of the first circular arc 51 points to a negative direction of an X axis, while an acceleration vector $a_2$ at a beginning point of the second circular arc 52 points to a positive direction of the X axis. That is, at the point P where the path changes from the circular arc 51 to the circular arc 52, the direction of the acceleration in the X axis changes 180 degrees. Accordingly, even when the degree of the acceleration is within an allowable range, the acceleration suddenly changes due to the inversion of the acceleration direction.

Such abrupt change in acceleration causes the machine to act to reverse the drive power of the motor, giving a great impact on the machine. Such an impact will adversely affect the accuracy in machining. Thus, such an abrupt change in the acceleration has to be avoided as far as possible.

However, since conventional apparatuses are not provided with means for reducing an abrupt change in acceleration at a joint in circular arcs, a great impact force is given on a machine tool operating at a high machining speed such as a laser machining device, with the result that a machining at a high-speed and with high-accuracy can not easily be realized.

SUMMARY OF THE INVENTION

An object of the present invention is to provide a numerical control apparatus for controlling movement of a tool by changing a speed command so as to minimize change in accelerations at an end point of a block and at a beginning point of a next block in a machining program and controlling the tool movement in accordance with the changed speed command and also to provide an automatic programming apparatus for making a machining program in which such changed speed command is set.

In order to achieve the above object, the numerical control apparatus according to the present invention comprises: pre-processing and arithmetic means for decoding a machining program in which commands for machining shapes and machining speeds are set in respective blocks; acceleration change determination means for calculating the amount of change in accelerations between an end point of a block and a beginning point of next block in said machining program and determining whether or not said amount of change exceeds a predetermined threshold value; speed commanding means for reducing a commanded machining speed at the end point of said block and the beginning point of said next block in such a manner that the amount of change will not exceed the threshold value when the acceleration change determination means determines that the change in acceleration is over the threshold value; and movement control means for controlling movement of the tool in accordance with the speed command from the speed commanding means.

Furthermore, the automatic programming apparatus for making a machining program to be executed by the numerical control apparatus in accordance with the present invention comprises machining path forming means for forming a machining path in accordance with data specifying a machining shape; acceleration change determination means for calculating an acceleration based on the machining path to determine whether or not there exists an acceleration transition point at which an acceleration change with time is equal to or more than a predetermined value; speed command data changing means for changing a moving speed command data at the acceleration transition point to a data for a lower speed when the acceleration transition point is detected; and machining program making means for setting a speed data so that a speed at the acceleration transition point becomes a speed commanded by the speed command data changing means to make a machining program.

As described above, according to the present invention, a point at which a change in acceleration is greater than a predetermined value is detected and a moving speed at the point is reduced. Thus, even when a rotating direction of a circular arc is inverted, an abrupt change in acceleration can be prevented, and an impact on the machine can be made smaller, so that machining can be carried out at a high speed and with high accuracy.

DESCRIPTION OF THE PREFERRED EMBODIMENTS

Figure 1:
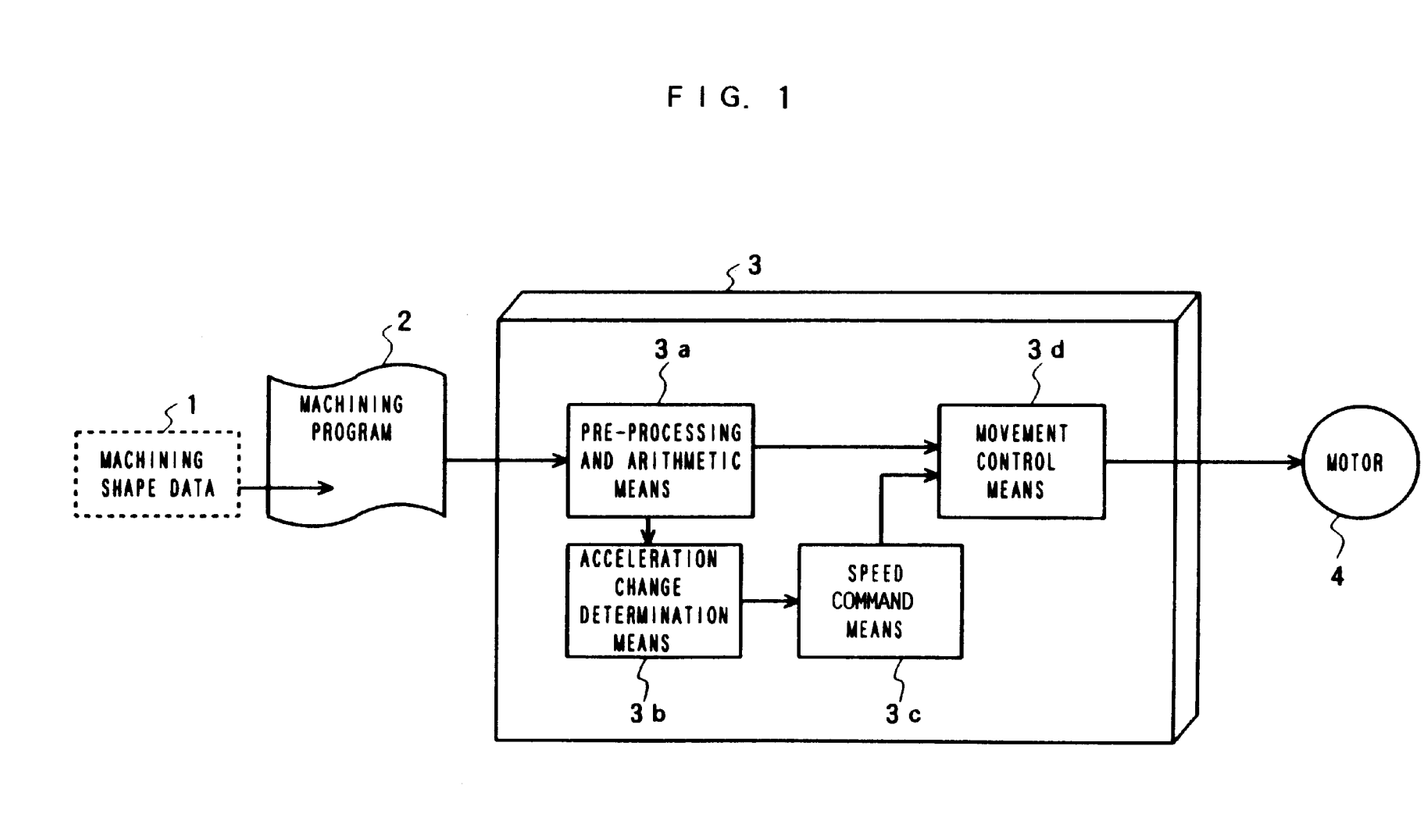
FIG. 1 is a block diagram showing elements constituting a numerical control apparatus in accordance with the present invention.

At first, elements constituting the numerical control apparatus in accordance with the present invention will be explained referring to a block diagram shown in FIG. 1.

The numerical control apparatus 3 comprises a pre-processing and arithmetic means 3a, an acceleration change determination means 3b, a speed command means 3c and a movement control means 3d. The pre-processing and arithmetic means 3a decodes a machining program 2.

In the machining program 2, commands concerning a machining shape 1 and a machining speed are set in block units. The machining shape 1 is divided into a plurality of block units (command units) of lines and circular arcs.

The acceleration change determination means 3b determines whether or not the change in acceleration at a joint in the blocks exceeds a predetermined threshold value.

The speed command means 3c lowers a command speed at a joint in the blocks when it determines that the change in acceleration has exceeded the threshold value. The movement control means 3d outputs an interpolation pulse to each movement axis in such a manner that the speed at the point where the change in the acceleration has exceeded the threshold value becomes equal to the speed commanded by the speed command means 3c. In accordance with the interpolation pulse, rotation of a servo motor is controlled.

In the case of the numerical control apparatus 3 comprising the above elements, the moving speed is reduced at the point where the change in acceleration increases according to the program, so that the change in acceleration can be held to a predetermined level.

Next, the hardware configuration of the numerical control apparatus in accordance with the present invention will be explained referring to FIG. 2.

A processor 11 is connected through a bus 19 to a ROM 12, a RAM 13, a nonvolatile memory 14, a CRT/MDI unit 20, axis control circuits 15 and PC (a programmable controller) 18.

The processor 11 controls the whole of the numerical control apparatus in accordance with a system program stored in the ROM 12. An EPROM or an EEPROM is used for the ROM 12. A SRAM or the like is used for the RAM 13, and temporary calculation data, display data, input and output signals and the like are stored in the RAM 13. A CMOS, backed up by a battery (not shown), is used for the nonvolatile memory 14 and the nonvolatile memory 14 stores parameters, machining programs, tool correction data, pitch error correction data and the like which should be held even after switching off power source.

The CRT/MDI unit 20 is disposed on the front of the numerical control apparatus or disposed in a plane where a machine operating board is mounted, and comprises a graphic control circuit 21, a display device 22, a keyboard 23 and a software key 24 and the like. The graphic control circuit 21 converts digital signals such as numerical data and pattern data into raster signals for display and sends the signals to the display device 22. The display device 22 displays these numerals and patterns. A CRT or a liquid crystal display device is used for the display device 22. The keyboard 23 has numerical keys, symbolic keys, letter keys and function keys, and is used for making and editing the machining programs and for operating the numerical control apparatus. The software key 24 is disposed at the bottom of the display device 22 and the function thereof is displayed on the display device 22. When the function displayed on the screen of display device 22 changes, the function of the software key 24 also changes in accordance with the displayed function.

The axis control circuits 15 receive a movement command for each axis from the processor 11 and outputs a movement command for individual axes to servo amplifiers 16. The servo amplifiers 16 amplify the movement command to drive a servo motor connected to a machine tool 30, and control relative motions of a tool of the machine tool 30 and a work piece. The number of axis control circuits 15 and servo motors 16 provided correspond to the number of axes of the servo motor.

PC (programmable controller) 18 receives an M (miscellaneous) function signal, an S (spindle speed control) function signal, a T (tool selection) function signal and the like. The programmable controller 18 processes these signals by a sequence program, outputs an output signal and controls a pneumatic mechanism, a hydraulic mechanism, an electromagnetic actuator and the like arranged in the machine tool 30. Further, the programmable controller 18 receives a button signal, a switch signal and a limit switch signal, preforms a sequence processing and transfers a necessary input signal to the processor 11 through the bus 19.

Figure 2:
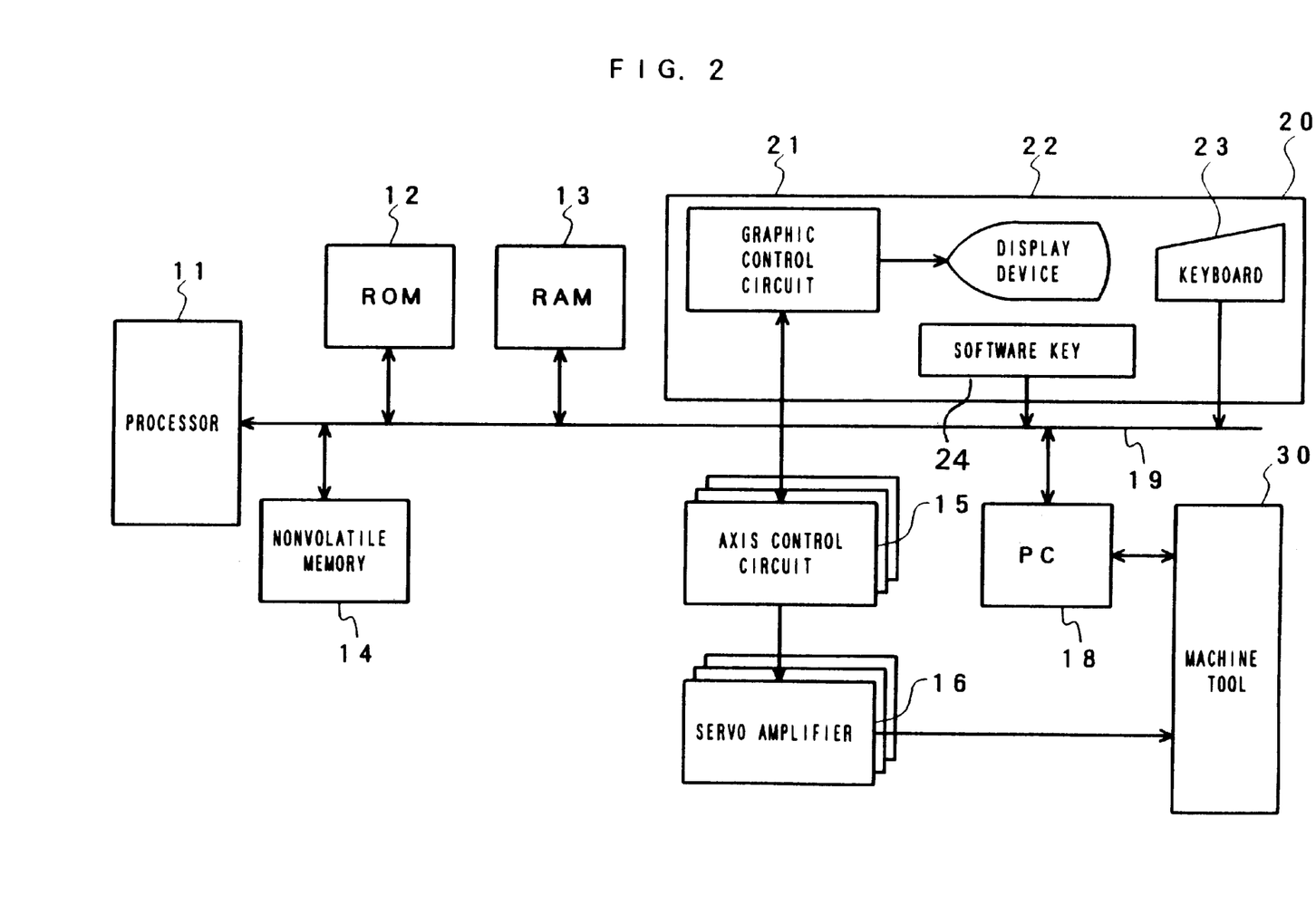
FIG. 2 is a block diagram schematically showing a hardware configuration of the numerical control apparatus in accordance with the present invention.

In FIG. 2, a spindle motor control circuit and an amplifier for a spindle motor are omitted.

In the above-explained embodiments, explanation is provided for the case where only one processor 11 is used, however, a multiple-processor configuration comprising a plurality of processors may be used.

Next, for example, when the machining program is one like a program for the machining at a constant speed along a path shown in FIG. 7, a method for controlling change in acceleration by using the above-described numerical control apparatus will be explained specifically.

The path shown in FIG. 7 comprises two circular arc blocks joined with each other. The first circular arc 51 has a center O1 and a radius r, and the second circular arc 52 has a center O2 and a radius r which is equal to the radius of the first circular arc 51. The center O1 of the first circular arc 51 is on the left side of the moving path comprising these two circular arcs 51,52 with respect to the direction of movement, and the center O2 of the second circular arc 52 is on the right side thereof.

The commanded speed is a constant velocity v which directs from the first circular arc 51 to the second circular arc 52. Reduction of speed when the change in acceleration at the joint (point P) in the two circular arcs 51 and 52 is larger than the threshold value and increase in speed thereafter to restore the velocity v are made linearly. That is, the absolute value of acceleration and deceleration when increasing and decreasing the speed is set to A. The threshold value of change in acceleration and deceleration is set to 2A. This threshold value corresponds to a change in acceleration from A to −A. That is, the commanded speed v is not reduced when the acceleration value is changed from A0, being less than A, to −A0.

In the above condition, in the case where movement along the circular arcs 51 and 52 shown in FIG. 7 is commanded by the machining program, first the acceleration value occurring in the path is calculated.

The value of acceleration during the movement on the circular arc is calculated by the following formula (1):

$$a = v^2/r \quad (1)$$

In this case, the acceleration value a directs toward the center of the circular arc. When, as shown in FIG. 7, the center O1 of the first circular arc 51 is on the left side of the moving path with respect to the direction of movement, and, the center O2 of the second circular arc 52 is on the right side of the moving path, and further, a tangential line of the circular arc 51 at the joint P is in accord with a tangential line of circular arc 52 at the joint P, the acceleration value $a_1$ (equals to −a) at the end point of the circular arc 51 and the acceleration value $a_2$ (equals to a) at the beginning point of the circular arc 52 are equal in magnitude and diametrically opposite in direction.

Therefore, the amount of change ΔA in the acceleration at the joint P in the two circular arcs 51 and 52 can be expressed by the following formula:

$$\Delta A = |a_2 - a_1| = a - (-a) = 2a \quad (2)$$
$$= 2v^2/r$$

Then, the amount of change ΔA in the acceleration is compared with the threshold value 2A. When the amount of change ΔA in the acceleration value is greater than the threshold value 2A, the speed at the joint P is reduced, thereby limiting the change in acceleration at the point P to 2A. A velocity F necessary for limiting the change in acceleration at the joint P to the value 2A is obtained by the following formula which is derived from the above formula (2):

$$2A = 2F^2/r$$

Accordingly, the following formula (3) is obtained:

$$F = (Ar)^{1/2} \quad (3)$$

Accordingly, the velocity v is reduced with an acceleration "−A" in the vicinity of the end point of the circular arc 51 so that the velocity is reduced to a velocity "F" at the joint P. A speed reduction starting point is determined by a present speed (a constant speed), the target velocity F and the acceleration value −A. The velocity is accelerated with the acceleration "A" to the original commanded velocity v upon entering the path of the circular arc 52.

Next, the acceleration in the moving direction (tangential direction) and the acceleration in the normal direction on the path shown in FIG. 7 will be explained referring to FIGS. 3A and 3B.

Figure 3A:
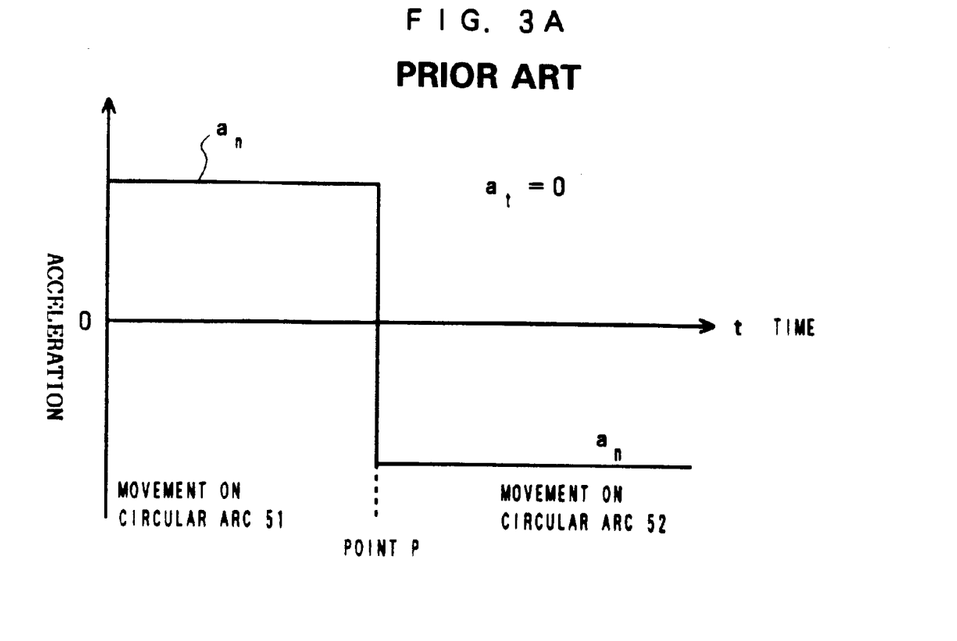
FIG. 3A is a graph showing an acceleration in a tangential direction and an acceleration in a normal direction when a moving speed on a moving path does not change in accordance with the present invention.

FIG. 3A shows the acceleration in the case where the moving velocity v on the moving path is not changed, and thus the change in acceleration at the joint (point P) in the first circular arc and the second circular arc is not limited. FIG. 3B shows the acceleration in the case where the moving velocity v on the moving path is changed in accordance with the present invention and the change in acceleration at the joint (point P) in the first circular arc and the second circular arc is limited. The moving path in this figure comprises the two circular arc blocks 51 and 52 as shown in FIG. 7. That is, the moving path has the center O1 of the first circular arc 51 on the left side of the moving direction, the center O2 of the second circular arc 52 in the right side of the moving direction, and the tangential lines of the arcs agree with each other at the joint P in these circular arcs 51 and 52.

In these figures, an axis of abscissa represents time and an axis of ordinate represents acceleration value, respectively. An acceleration in the normal direction is defined to be positive when the acceleration is directed to the left side of the moving direction and negative when the acceleration is directed to the right side of the moving direction. An acceleration in the tangential direction is defined to be positive when the acceleration is directed in the forward direction of the moving direction and negative when the acceleration is directed in the backward direction of the moving direction.

In the case of FIG. 3A in which the moving speed v on the path (velocity in the tangential direction) is not changed, the acceleration in the normal direction is changed from $a_n$ (which is shown as the acceleration $a_1$ in the direction of the center O1 in FIG. 7) to $-a_n$ (which is shown as the acceleration $a_2$ directing to the center O2 in FIG. 7). That is, the amount of change in the acceleration is $2a_n$ (assuming that the radius of the circular arc 51 is equal to the radius of the circular arc 52). Since the moving velocity along the moving path is a constant value v, the acceleration $a_t$ in the tangential direction is always zero.

Figure 3B:
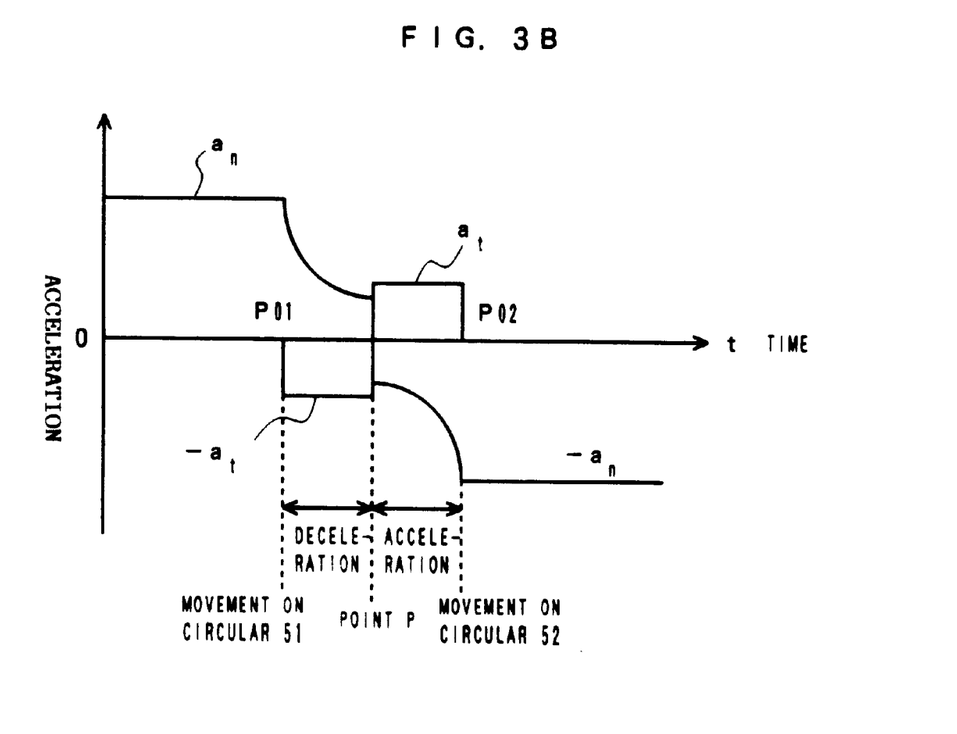
FIG. 3B is a graph showing an acceleration in a tangential direction and an acceleration in a normal direction when a moving speed on a moving path is changed (at a constant acceleration) in accordance with the present invention.

In the case of FIG. 3B in which the moving speed v on the path (velocity in the tangential direction) is changed, the reduction of speed is started from a time (point P01) which is near the end point (point P) on the first circular arc 51. In the embodiment shown in FIG. 3B, the speed reduction is a linear reduction, and the acceleration in the tangential direction is a constant value ($-a_t$). That is, the constant velocity v is maintained until the point P01 on the first circular arc 51, and the velocity is linearly reduced from the velocity v to the velocity F (refer to the above formula (3)) between the points P01 and P. Further, movement on the second circular arc 52 is started from the point P at the velocity F, increasing the velocity linearly, and the velocity is made to return to the normal velocity v at the time (point P02) which is slightly past the point P. The acceleration in the tangential direction between the points P and P02 is a constant value ($a_t$).

By the way, since the acceleration $a_n$ in the normal direction is in inverse proportion to a square of the velocity in the tangential direction (refer to the above formula (1)), the acceleration value $a_n$ starts to reduce at the time (point P01) at which the tangential velocity changes and becomes A (which is a half of the threshold value 2A) at the point P. And the acceleration value in the normal direction becomes −A at the point P, when movement on the second circular arc 52 is started. That is, the acceleration at the point P changes from A to −A, and the amount of change is 2A. Since the velocity increases from the point P to the point P02 on the second circular arc 52, the acceleration in the normal direction also increases.

Comparing the case of FIG. 3A with the case of FIG. 3B, it is apparent that the amount of the reduction of moving speed in the normal direction at the point P can be made smaller when the moving velocity (in tangential direction) near the joint P in the two circular arcs 51 and 52 is reduced.

Next, explanation will be made as a component in the X axis direction and a component in the Y axis direction of the acceleration in the normal direction on the moving path on the X-Y plane as shown in FIG. 7 referring to FIGS. 4A and 4B. In FIG. 7, the points O1, P and O2 are on the same line parallel to the X axis, while the tangential line of the first circular arc 51 and the tangential line of the second circular arc 52 at the point P are both. parallel to the Y axis.

Figure 4A:
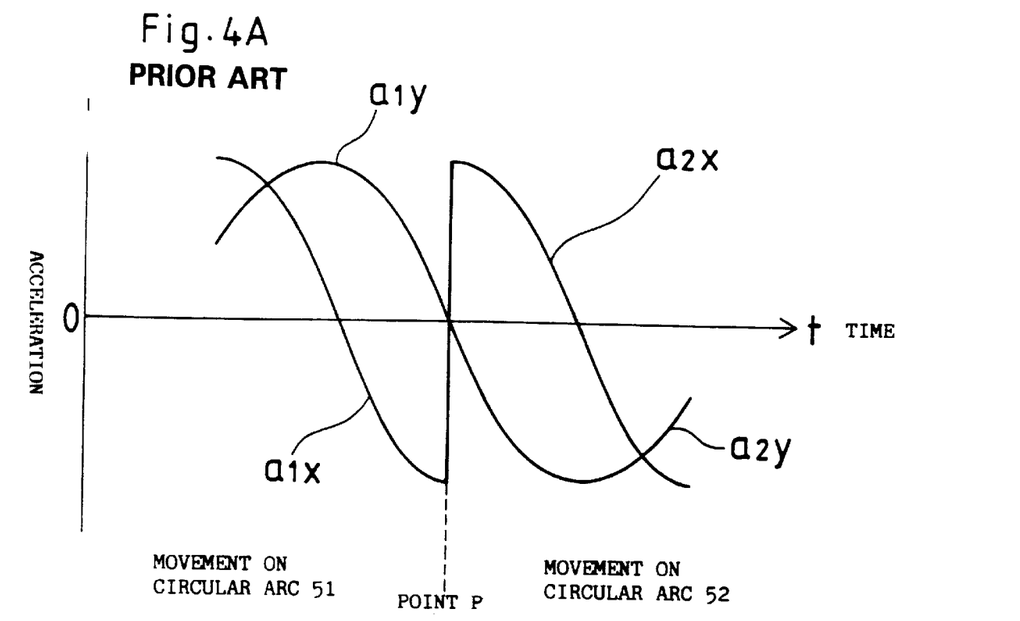
FIG. 4A is a graph showing a component in an X axis direction and a component in a Y axis direction of the acceleration when a moving speed on a moving path does not change in accordance with the present invention.

FIG. 4A shows the case in which the moving velocity v on the path (velocity in the tangential direction) is not changed. That is, in this case, acceleration occurs only during a circular motion. A component $a_{1x}$ in the X axis direction and a component $a_{1y}$ in the Y axis direction of the acceleration $a_1$ directing to the center O1 of the circular arc both form a sine curve during the movement on the first circular arc 51. An absolute value of the X axis component $a_{1x}$ of the acceleration $a_1$ becomes a maximum value in the joint P in the two circular arcs 51 and 52 (in this case, with respect to the X-axis, rightward direction is for positive value, and with respect to Y-axis, upward direction is for positive value). Moving onto the second circular arc 52 at the point P, however, an X axis component $a_{2x}$ of an acceleration $a_2$ is equal in absolute value to the X axis component $a_{1x}$ of the acceleration $a_1$ at the point P1 of the first circular arc 51 but is inverse in direction to the latter (being positive in this case). Thus, it is clear that, at this point P, the accelerations suddenly change in the X axis direction. The acceleration will not change in the Y axis direction at the point P.

Figure 4B:
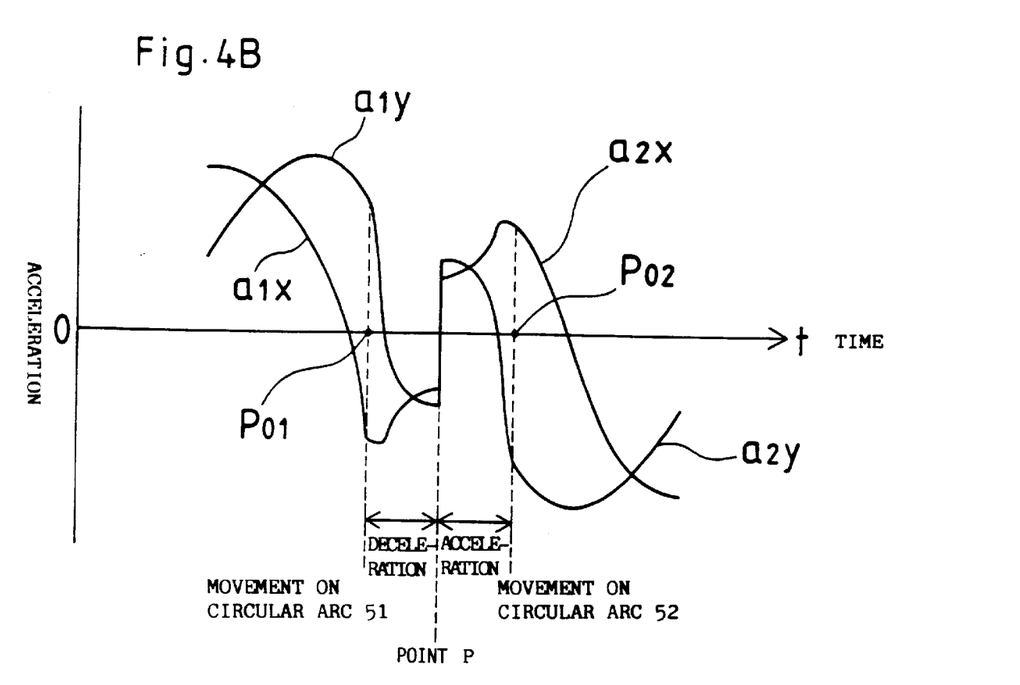
FIG. 4B is a graph showing a component in an X axis direction and a component in a Y axis direction of the acceleration when a moving speed on a moving path is changed in accordance with the present invention.

FIG. 4B shows the case in which the moving velocity v on the path (velocity in the tangential direction) is changed at about the joint P in the circular arcs. When the reduction of moving velocity v is started at a point (point P01) near the end (point P) of the first circular arc 51, the acceleration value $a_1$ from the point P01 to the joint P becomes a composition of an acceleration by the circular motion (which directs toward the center O1 of the circular arc) and an acceleration in the tangential direction of the circular arc. Thus, the X axis component $a_{1x}$ and the Y axis component $a_{1y}$ of the acceleration $a_1$ form the sine curve up to the point P01, like the case of FIG. 4A, but deviate from the sine curve from the point P01 to the point P. Particularly, upon reaching the point P, the acceleration in the tangential direction of the circular arc becomes the acceleration in the Y axis direction, so that the Y axis component a1y of the acceleration $a_1$ will not become zero at the point P (like the case in FIG. 4A). Since the moving velocity v increases from the starting point (point P) of the second circular arc 52 to the point P02, the acceleration $a_2$ becomes a composition of an acceleration by circular motion (directing toward the center O2 of the circular arc) and an acceleration in the tangential direction of the circular arc. Accordingly, at the starting point P of the second circular arc 52 the acceleration in the tangential direction of the circular arc becomes the acceleration in Y axis direction, so that Y axis component $a_{2y}$ of the acceleration $a_2$ will not become zero. However, the acceleration in the tangential direction of the circular arc (that is, the Y axis direction) near the joining point P of the two circular arcs is limited to the value not more than the predetermined value (−A in the first circular arc 51 and A in the second circular arc 52), it is designed that the difference $(a_{2y}-a_{1y})$ of the Y axis components of the accelerations between immediately before and immediately after the point P will not become too large. Further, the X axis components of the accelerations at immediately before and immediately after the point P (that is, the acceleration due to the circular motion) have small absolute values, so that the difference therebetween (a2y−a1y) will not become too large.

Described hereinabove is the case where acceleration and deceleration in the tangential direction at the point before and after the joint. P in the circular arcs are a linear type acceleration and deceleration, that is, the acceleration values in the-tangential direction before and after the point P are respectively constant values. However, the present invention can also be applied to the case where an absolute value of the acceleration is gradually increased during acceleration and an absolute value of the deceleration is gradually decreased during deceleration (hereinafter such acceleration and deceleration is called as a "bell type" acceleration and deceleration).

The case where the change in acceleration is limited by using such a bell type acceleration and deceleration will be explained with respect to FIG. 5. In this case, the moving path in FIG. 7 applies.

Figure 5:
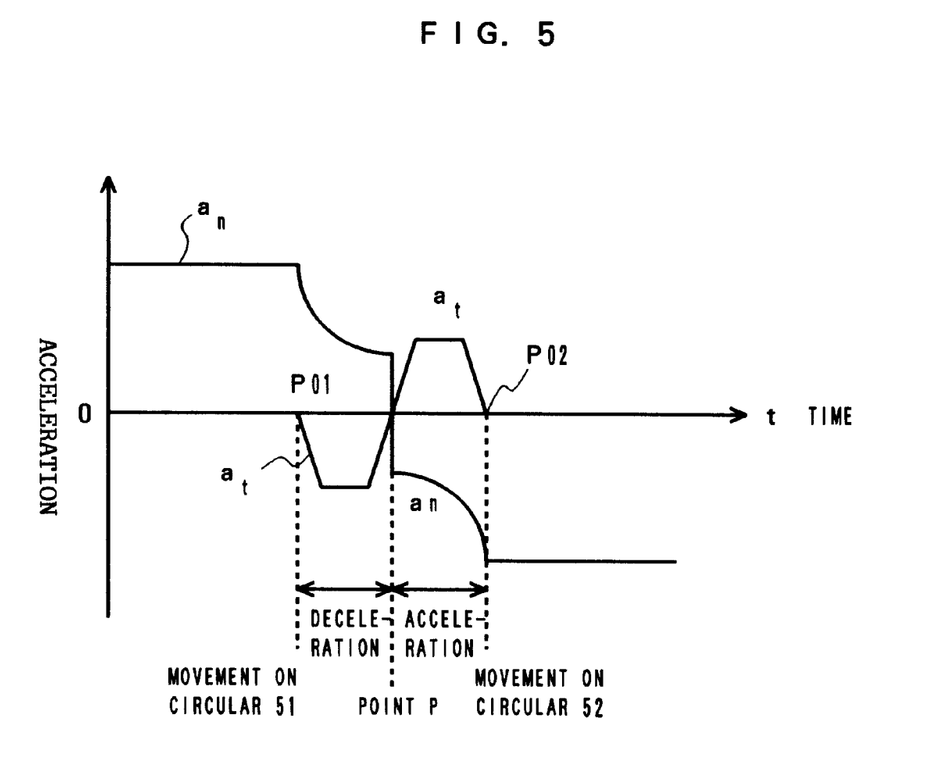
FIG. 5 is a graph showing an acceleration in a tangential direction and an acceleration in a normal direction when a moving speed on a moving path is changed (by linearly changing the acceleration) in accordance with the present invention.

In the graph of FIG. 5, an axis of abscissa represents time t and an axis of ordinate represents acceleration, and an acceleration $a_n$ in the normal direction of the moving path and an acceleration $a_t$ in the tangential direction are plotted. With regard to the acceleration $a_t$ in the normal direction, it is supposed to be positive when the acceleration $a_n$ directs leftward with respect to the moving direction and negative when it directs rightward with respect to the moving direction. Further, with regard to the acceleration $a_t$ in the tangential direction, it is supposed to be positive when the acceleration $a_t$ directs forward with respect to the moving direction and negative when it directs rearward with respect to the moving direction.

When the point P01 is reached by way of the first circular arc 51, the absolute value of the acceleration $a_t$ in the tangential direction is gradually increased in negative direction from zero (moving with constant speed) until reaching a predetermined point immediately before the point P and then gradually decreased until reaching the point P where it becomes zero. Next, during a short period after entering the circular arc 52 from the point P, the acceleration $a_t$ in the tangential direction is gradually increased from zero to a positive value until reaching a predetermined point immediately before the point P02, then the absolute value of the acceleration is gradually decreased towards the point P02 where the acceleration becomes zero, and thereafter the resulting speed is maintained.

By applying the above explained acceleration $a_t$ in the tangential direction, the velocity v in the tangential direction is not constant between times t1 and t2, so that the acceleration $a_n$ during movement on the circular arcs 51 and 52 has a shape as shown in FIG. 5.

As mentioned above, by using the bell type acceleration and deceleration, the change in the acceleration $a_t$ in the tangential direction can be made gentle before and after the point P.

As described in the foregoing, the change in the acceleration can be reduced when moving from the first circular arc to the second circular arc, switching from the counter-clockwise turn to the clockwise turn and vice versa. In this way, the impact on the machine is reduced. Accordingly, the machining shape can be prevented from being affected by vibration, and control can be prevented from becoming unstable due to excessive load on the motor, whereby machining with high speed and high accuracy can be realized.

Also, it is possible to designate by the block of the machining programs whether or not to reduce speed at a point where the change in acceleration is relatively large. In this way, it is necessary only to designate the block requiring the machining to be carried out with high accuracy, so that machining time can be reduced, since the speed need not be reduced in those blocks not requiring verb high accuracy.

Further, the above-explained machining program which restrains an abrupt change in acceleration may be created by an automatic programming apparatus.

Figure 6:
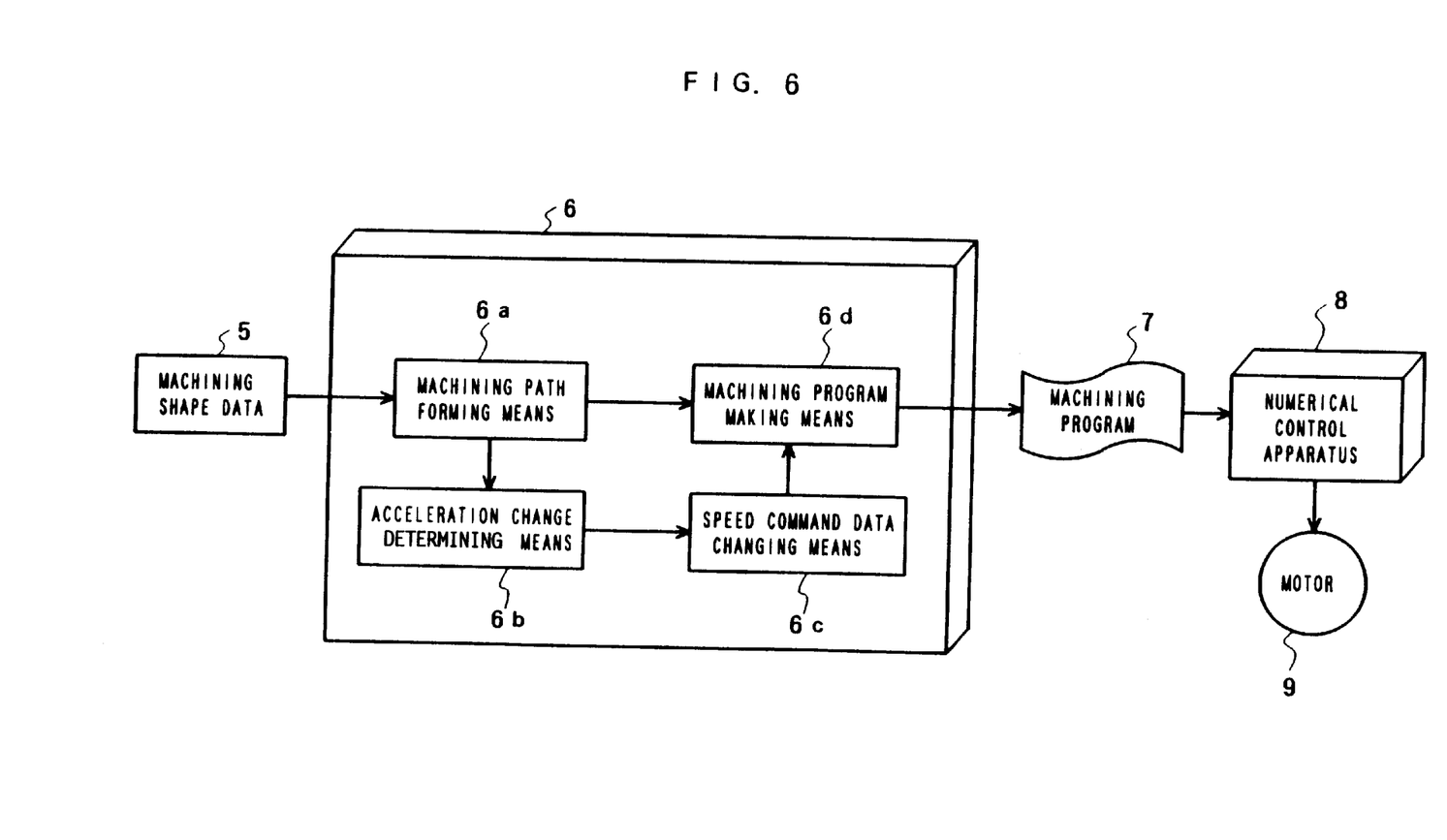
FIG. 6 is a block diagram showing elements comprising an automatic programming apparatus in accordance with the present invention.

FIG. 6 is a block diagram showing a schematic structure of such an automatic programming apparatus in accordance with the present invention. In an automatic programming apparatus 6, a machining path forming means 6a calculates a machining path when machining shape data 5 are input. An acceleration change determining means 6b calculates an acceleration in the working path and determines whether or not a change in an acceleration at a joining point in the circular blocks is more than the predetermined threshold value.

A speed command data changing means 6c changes a speed command data for a point at which a change in acceleration is found to be more than the threshold value, thereby reducing the speed. A machining program making means 6d makes a machining program 7 in such a manner that the speed at the point where the change in acceleration is found to be more than the threshold value becomes a speed commanded by the speed command data changing means 6c.

It becomes possible to perform machining in which an abrupt change in acceleration is limited by controlling the servo motor 9 of the machine tool through the execution of the machining program 7 with a numerical control apparatus 8. Further, in making a machining program, it is also possible to specify any one of block for which control for restraining an abrupt change in acceleration is to be carried out.

Since it is necessary for a moving speed to be reduced at a point P in which an acceleration changes, reduction of moving speed may be completed prior to reaching the point P and the moving speed after passing through the point P may return to the original speed after moving a predetermined distance (predetermined time) from the point P. However, this method has a shortcoming such that it requires a relatively long machining time.

What is claimed is:

1. A numerical control apparatus comprising:
   pre-processing and arithmetic means for decoding a machining program in which commands for machining shapes and machining speeds are set in respective blocks;
   acceleration change determination means for calculating an amount of change in accelerations between an end point of a block and a beginning point of a next block in said machining program and determining whether or not said amount of change exceeds a predetermined threshold value;
   speed commanding means for reducing a commanded machining speed at the end point of said block and the beginning point of said next block in such a manner that the amount of change will not exceed the predetermined threshold value when the acceleration change determination means determines that the change in acceleration is over the predetermined threshold value; and
   movement control means for controlling movement of a tool in accordance with the speed command from the speed commanding means.

2. A numerical control apparatus according to claim 1, wherein only in the case where the block of the machining program includes a command requiring the machining speed to be reduced if changes in accelerations at an end point of the block and a beginning point of the next block are over said predetermined threshold value, the movement of the tool in the end of the block and the beginning of the next block is controlled in accordance with said command requiring the reduction of the speed.

3. A numerical control apparatus according to claim 1, wherein said speed commanding means calculates a target speed at a reduced machining speed based on a speed before the machining speed is reduced by command, an acceleration for reducing the speed and a radius of curvature of the path.

4. A numerical control apparatus according to claim 1, wherein said reduction of the machining speed at the end point of a block and at the beginning point of the next block by said speed commanding means is respectively performed on the bases of constant deceleration and acceleration.

5. A numerical control apparatus according to claim 1, wherein said reduction of the machining speed at the end point of a block and at the beginning point of the next block by said speed commanding means is performed by the steps comprising a first step for gradually increasing an absolute value of the acceleration, a second step for keeping said increased value for a predetermined duration and a third step for gradually reducing an absolute value of the acceleration.

6. A tool movement control method for limiting a change in acceleration at a joint in blocks in a machining program, comprising the steps of:
   decoding a machining program in which commands for machining shapes and machining speeds are set in respective blocks, calculating respective changes in acceleration at the end point of a block and at the beginning point of the next block in the decoded machining program and determining whether or not the change degree is over a predetermined threshold value;
   modifying a machining speed command for a small section to the end point of the block and a small section from the beginning point of the next block in such a manner that the amounts of change will not exceed the predetermined threshold value, when, as a result of said determination, the change in acceleration is over the predetermined threshold value; and
   controlling movement of the tool in accordance with said modified machining speed command.

7. An automatic programming apparatus for making a machining program to be executed by a numerical control apparatus comprising:
   machining path forming means for forming a machining path in accordance with data specifying a machining shape, p1 acceleration change determination means for calculating an acceleration based on the machining path to determine whether or not there exists an acceleration transition point at which an acceleration change with time is equal to or more than a predetermined value;

speed command data changing means for changing a moving speed command data at the acceleration transition point to a data for a lower speed when the acceleration transition point is detected; and machining program making means for setting a speed data so that a speed at the acceleration transition point becomes a speed commanded by the speed command data changing means to make a machining program.

8. An automatic programming apparatus according to claim 7, wherein said acceleration change determination means determines a change in acceleration with time at a joint in units of tool path command.

9. An automatic programming apparatus according to claim 7, wherein said machining program making means sets the speed data so that the speed at said acceleration transition point becomes a speed commanded by said speed command data changing means only when a command for reducing the moving speed at the acceleration transition point is output.

10. An automatic programming apparatus according to claim 7, wherein said speed command data changing means calculates a target speed to be attained by deceleration based on a speed before deceleration, a deceleration applied for reduction and a curvature of the path, when the units of the tool path command are arranged to be adjacent to each other.

* * * * *

UNITED STATES PATENT AND TRADEMARK OFFICE
CERTIFICATE OF CORRECTION

PATENT NO. : 5,959,864
DATED : September 28, 1999
INVENTOR(S) : Atsushi MORI, et al.

It is certified that error appears in the above-identified patent and that said Letters Patent is hereby corrected as shown below:

Title Page:

[75] line 1, change "Oshino-mura" to --Minamitsuru--;
line 2, delete "-gun".

Col. 4, line 54, change "preforms" to --performs--;

Col. 5, line 8, change "02" to --O2--;

Col. 8, line 18, after "joint" delete "[.]".

Col. 8, line 20, delete [-] between "the" and "tangential".

Col. 9, line 51, change "P", first occurrence, to --P--;

Col. 9, line 53, change "P", first occurrence, to --P--.

Col. 10, line 65, delete "[p1]" and "acceleration begins a new paragraph.

Signed and Sealed this

Twenty-second Day of August, 2000

Attest:

Q. TODD DICKINSON

*Attesting Officer*　　　*Director of Patents and Trademarks*